US012642255B1

(12) United States Patent
McKinney et al.

(10) Patent No.: US 12,642,255 B1
(45) Date of Patent: Jun. 2, 2026

(54) CONTAINMENT SYSTEM FOR CRAB AND CRUSTACEAN AQUACULTURE AND PRE-DISTRIBUTION STORAGE

(71) Applicants: Patrick L. McKinney, Dover, DE (US); Jerry L. McKinney, Dover, DE (US)

(72) Inventors: Patrick L. McKinney, Dover, DE (US); Jerry L. McKinney, Dover, DE (US)

( * ) Notice: Subject to any disclaimer, the term of this patent is extended or adjusted under 35 U.S.C. 154(b) by 152 days.

(21) Appl. No.: 18/594,223

(22) Filed: Mar. 4, 2024

(51) Int. Cl.
A01K 61/59 (2017.01)
A01K 61/55 (2017.01)

(52) U.S. Cl.
CPC .............. A01K 61/59 (2017.01); A01K 61/55 (2017.01)

(58) Field of Classification Search
CPC ......... A01K 61/59; A01K 61/55; A01K 61/53
See application file for complete search history.

(56) References Cited

U.S. PATENT DOCUMENTS

| | | | | |
|---|---|---|---|---|
| 399,241 | A | * | 3/1889 | Burns ..................... A01K 61/59 |
| | | | | 119/209 |
| 3,707,948 | A | * | 1/1973 | Dunathan .............. A01K 61/54 |
| | | | | 119/236 |
| 3,774,575 | A | * | 11/1973 | Patterson ............. A01K 63/003 |
| | | | | 119/245 |
| 3,961,925 | A | * | 6/1976 | Rhoad ..................... F25D 17/02 |
| | | | | 134/123 |
| 3,963,125 | A | * | 6/1976 | Baggott ................. A47B 31/00 |
| | | | | 211/126.15 |
| 4,159,009 | A | * | 6/1979 | Friedman .............. A01K 61/17 |
| | | | | 119/218 |
| 4,266,509 | A | * | 5/1981 | Gollott ................... A01K 61/59 |
| | | | | 54/71 |

(Continued)

FOREIGN PATENT DOCUMENTS

| | | |
|---|---|---|
| CN | 207604369 U | 7/2018 |
| CN | 110574719 A | 12/2019 |

(Continued)

OTHER PUBLICATIONS

Translation of KR 100821313 B1 (Year: 2008).*

*Primary Examiner* — Timothy D Collins
*Assistant Examiner* — Brittany A Lowery
(74) *Attorney, Agent, or Firm* — Rogowski Law LLC

(57) ABSTRACT

A containment system specifically adapted to hold crabs and other crustaceans either in an aquaculture storage tank of a recirculating aquaculture system or outside of the storage tank includes tray compartments that slidably engage shelf projections or tracks extending from sidewalls or upright posts of a support frame. The top tray lid is latched, and handles are provided on the tray sidewalls. A removable sleeve attached to the tray deters crabs from evacuating the tray compartment when the tray lid is opened. The support frame is supported for rolling movement. Each tray compartment has porous walls and houses one or multiple crabs. Multiple tray compartments may be housed into the support frame in columns and rows as desired. The containment assembly (multiple frames and multiple tray compartments) may be lowered into or raised out of the aquaculture storage tank with automated equipment.

20 Claims, 7 Drawing Sheets

(56) References Cited

U.S. PATENT DOCUMENTS

| | | | | |
|---|---|---|---|---|
| 4,793,284 | A * | 12/1988 | Davis | A01K 61/59 |
| | | | | 56/8 |
| 5,237,959 | A * | 8/1993 | Bergeron | A01K 63/02 |
| | | | | 119/201 |
| 5,628,280 | A * | 5/1997 | Ericsson | A01K 61/60 |
| | | | | 119/239 |
| 6,584,935 | B2 | 7/2003 | Zohar | |
| 7,357,097 | B2 | 4/2008 | Drengstig | |
| 9,027,510 | B2 * | 5/2015 | Fujiyoshi | A01K 61/54 |
| | | | | 119/236 |
| 9,374,986 | B2 * | 6/2016 | Sheriff | A01K 63/042 |
| 9,655,347 | B2 | 5/2017 | Troy | |
| 10,463,027 | B2 * | 11/2019 | Boudreau | A01K 63/02 |
| 10,653,122 | B2 * | 5/2020 | Lu | F25D 25/025 |
| 11,122,782 | B1 * | 9/2021 | Vigliotta | A01K 61/60 |
| 2005/0284395 | A1 * | 12/2005 | Drengstig | A01K 61/59 |
| | | | | 119/225 |
| 2006/0130772 | A1 * | 6/2006 | Mortensen | A01K 61/54 |
| | | | | 119/240 |
| 2009/0151226 | A1 * | 6/2009 | Apps | B65D 21/0212 |
| | | | | 43/100 |
| 2012/0273504 | A1 * | 11/2012 | Rackley | F25D 25/025 |
| | | | | 220/592.02 |
| 2013/0255585 | A1 * | 10/2013 | Hamman | A01K 61/59 |
| | | | | 119/200 |
| 2018/0125041 | A1 | 5/2018 | Holm | |
| 2019/0141964 | A1 * | 5/2019 | Perslow | A01K 63/06 |
| | | | | 119/211 |
| 2020/0024030 | A1 * | 1/2020 | Kellerer | B65D 11/1833 |
| 2022/0279764 | A1 * | 9/2022 | Ward | A01K 61/54 |
| 2025/0221386 | A1 * | 7/2025 | Richardson | A01K 61/73 |

FOREIGN PATENT DOCUMENTS

| | | | |
|---|---|---|---|
| CN | 111134063 | A | 5/2020 |
| CN | 111320779 | A | 6/2020 |
| CN | 111513017 | A | 8/2020 |
| CN | 111727918 | A | 10/2020 |
| CN | 111771788 | A | 10/2020 |
| CN | 112167122 | A | 1/2021 |
| CN | 113207790 | A | 8/2021 |
| CN | 113615611 | A | 11/2021 |
| CN | 114097677 | A | 3/2022 |
| CN | 107251830 | B | 8/2022 |
| JP | 4803527 | B2 | 10/2011 |
| KR | 101948262 | B1 | 2/2019 |

* cited by examiner

CONTAINMENT SYSTEM FOR CRAB AND CRUSTACEAN AQUACULTURE AND PRE-DISTRIBUTION STORAGE

FIELD OF THE INVENTION

The present invention is generally directed to containment enclosures specially adapted for blue crabs and crustaceans raised in an open or a closed loop recirculating aquaculture system. The containment enclosures are adapted for immersion in an aqueous medium aquaculture system in which photoperiod is continuous, and water temperature and chemistry are monitored and controlled. The containment enclosures additionally are adapted to be removed from the aquaculture tank and retain the crabs and crustaceans therein for storage awaiting distribution to wholesalers or consumers.

BACKGROUND OF THE INVENTION

Crabs and other crustaceans (such as shrimp, lobster and crayfish) are difficult to farm raise due to their aggressive nature. When held together in a group, crabs and other crustaceans will attack one another, notwithstanding that the group has sufficient food and resources to sustain the group. High density crab farming heretofore has not been successful due to the cannibalistic nature of crabs and crustaceans.

Moreover, crabs when harvested today have an extremely short life-cycle out of water. Current industry practices result in approximately a 50% loss rate after 48 hours and a loss rate approaching 100% at 72 hours, notwithstanding that the crabs are stored at optimal cool temperatures (approx. 55-65° F.). An objective of the invention is to overcome these challenges and enable storage for an extended time with mitigated loss rates.

Accordingly, improvements for high density crab farming and distribution continue to be sought which reduce mortality/loss rates and extend the shelf-life for crabs to be sold for consumption.

BRIEF SUMMARY OF THE INVENTION

A containment system for crabs and other crustaceans is placed into a storage tank in which conditions such as water temperature, oxygenation, salinity and turbidity are monitored. The containment system includes a frame supported on casters or rollers so that the frame may be rolled into and out of the storage tank. Alternatively, the frame may be hoisted out of the tank with a winch or hoist or other mechanical assist. Individual lidded tray compartments are configured for holding one crab or groups of crabs or crustaceans and are slidably engaged onto cantilevered shelves or tracks within the frame.

In an advantageous embodiment, a containment system for farming crabs or other crustaceans has a frame supported for rolling movement within an aquaculture storage tank or on a support surface outside of the storage tank. In this embodiment, the frame is mounted on casters or rollers. The frame has two or more upright walls or posts from which shelf projections or tracks extend. The frame may have multiple upright walls or posts to define multiple columns between pairs of upright walls/posts. The shelf projections or tracks define multiple rows within each column.

At least one tray compartment is slidably inserted into the frame and engages with opposed shelf projections or tracks. The tray compartment comprises a porous material through which a fluid, such as water, may flow. Advantageous porous materials include a mesh, such as a rigid vinyl mesh or a metal mesh. The mesh may have honeycomb-shaped mesh openings sized to retain crab bodies and claws inside the tray compartment. In an especially advantageous embodiment, the tray compartment has a top lid, a tray bottom, a front wall, a rear wall, and at least two sidewalls, all of which are formed of a mesh. The tray bottom and tray top lid may be reinforced by straps, such as reinforced vinyl tie down straps. Each tray compartment is adapted to hold multiple crabs or crustaceans therein. The tray top lid may be hingedly connected to the rear wall of the tray to facilitate access to the interior volume of the tray compartment for loading or removing crabs from the tray compartment. The tray top lid is provided with at least one latch to retain the top lid in closed position when crabs are housed therein.

At least one pair of mount bearings is associated with each tray compartment. The first one of the mount bearings extends from the first sidewall and the second one of the mount bearings extends from the second sidewall. The mount bearings are configured to contact opposed shelf projections or tracks extending from the frame walls to support the tray compartment on the shelf projections or tracks. Each tray compartment is dimensioned to be slidingly received between two of the upright walls and supported by the mount bearings on opposed shelf projections or tracks extending from respective two upright walls.

At least one pair of grip handles is associated with each tray compartment, with the first one of the handles extending from the first sidewall and with the second one of the handles extending from the second sidewall. In an advantageous embodiment, mount plates are secured to the sidewalls of the tray compartment, and the grip handles are connected to the mount plates. The grip handles permit workers to move and lift individual tray compartments. The grip handles also may be sized and shaped to permit the tray compartments to be introduced into the frame or taken out of the frame with automated equipment.

A removable sleeve may be attached around a portion of the front wall, sidewalls and optionally the rear wall of the tray compartment. The removable sleeve may be a material such as vinyl sheet of a thickness that retards penetration or tearing by crab claws or other sharp edges. The removable sleeve is secured to the tray compartment with securement straps. In an advantageous embodiment, each sleeve insert is provided with at least one dimple configured to receive a pin of a pin lock to link the securement strap to the tray compartment. The removable sleeve is installed on a tray compartment before opening the tray lid. The removable sleeve creates an additional volume space above the tray compartment, which, when the tray lid is opened, protects workers from aggressive behaviors of the crabs contained in the tray compartment and deters crabs or other crustaceans from evacuating the tray compartment.

In a particularly advantageous embodiment the tray compartment sidewalls have a height of not more than 7 inches, and the tray compartment front wall and rear wall have a height of not more than 7 inches. In another particularly advantageous embodiment the tray compartment sidewalls have a height of not more than 6 inches, and the tray compartment front wall and rear wall have a height of not more than 6 inches. Surprisingly, we discovered that limiting the height of the tray compartment minimizes loss rates when multiple crabs and crustaceans are housed in the tray compartment, and also appears to reduce aggressive behavior within the tray compartment.

Another embodiment of the invention is an aquaculture system for crustaceans, particularly crabs, and more particularly blue claw crabs, that has at least one containment system as described herein disposed inside an aquaculture storage tank. The aquaculture system for crabs generally includes pumps for pumping the water and nutrients into the storage tank, anaerobic and aerobic tanks to manage water quality, a heater to control the temperature of the water that is pumped into the water treatment tanks, as well as natural heat exchange. In addition, the aquaculture system may include a sand filter and a bio filter remove solids and contaminants from the water cycled from the tank before that water is recirculated to the tank. The water preferably also is treated via bio-reactors, oxygenated with an aeration unit, and cooled prior to being returned to the storage tank.

The temperature controlled water is introduced into the storage tank in an amount sufficient to flow into each tray compartment housed in the frame of the containment system. Nutrients may be introduced into the storage tank, either by entraining with the water flow or by manual introduction upon opening the tray compartments.

In a particularly advantageous implementation of the aquaculture system, multiple containment systems with frames with multiple tray compartments housing crabs may be held in the aquaculture storage tank. In one such embodiment, a second containment system may be stacked over a first containment system, with both containment systems housing crabs in tray compartments of the respective systems.

Multiple compartments may be stacked in columns and rows as desired, and the entire containment assembly, or alternatively one specific column of a frame housing multiple tray compartments, may be lowered into or raised out of the storage tank with automated equipment.

While it is contemplated that the tray compartments will house multiple crabs, it is also envisioned that the tray compartments may be sized to house one individual crab per compartment.

BRIEF DESCRIPTION OF THE DRAWINGS

The foregoing summary, as well as the following detailed description of the disclosure, will be better understood when read in conjunction with the appended drawings. For the purpose of illustrating the disclosure, there is shown in the drawings an embodiment of a rack storage system for crabs that is preferred. It should be understood, however, that the disclosure is not limited to the precise arrangements and instrumentalities shown. In the drawings.

DESCRIPTION OF THE DISCLOSURE

Figure 1:
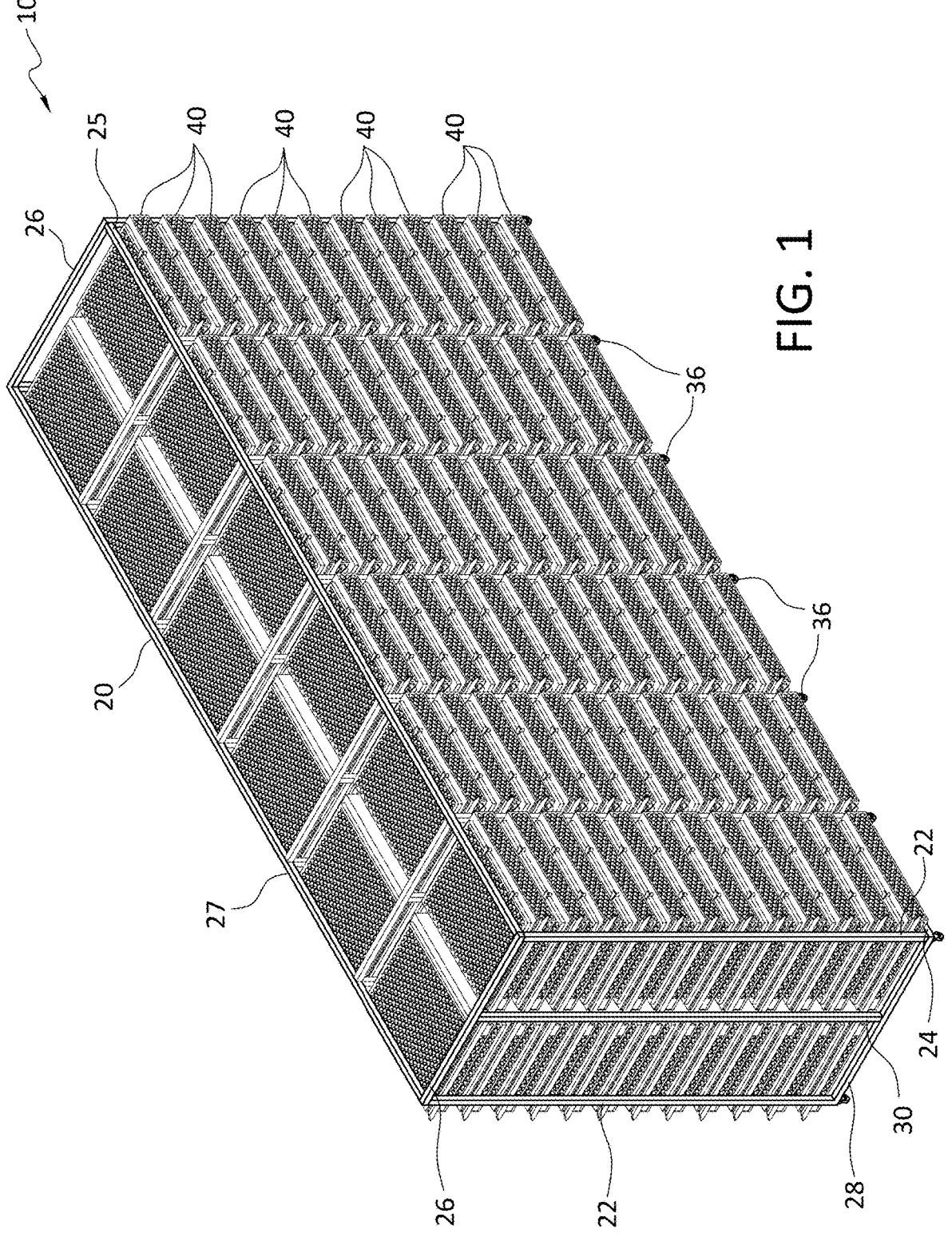
FIG. 1 is left front perspective view of a containment system for crabs and other crustaceans suitable for deployment in a tank of an aquaculture system or for deployment for storing the crabs and other crustaceans outside of a tank.
Figure 2:
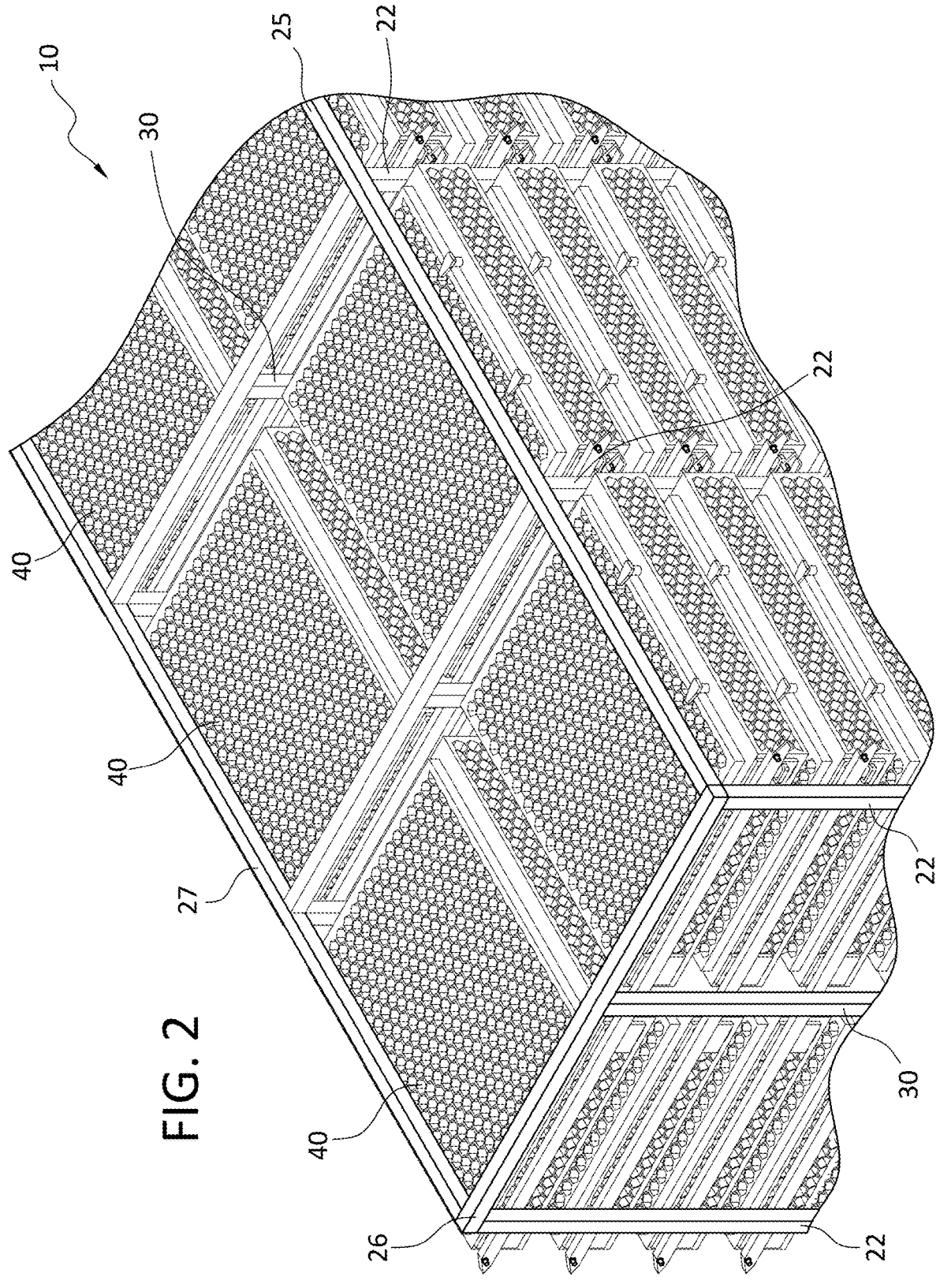
FIG. 2 is an enlarged perspective view of a top portion of the containment system of FIG. 1.

Certain terminology is used in the following description for convenience only and is not limiting. Unless specifically set forth herein, the terms "a," "an" and "the" are not limited to one element, but instead should be read as meaning "at least one." The terminology includes the words noted above, derivatives thereof and words of similar import.

It also should be understood that the terms "about," "approximately," "generally," "substantially" and like terms, used herein when referring to a dimension or characteristic of a component of the invention, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

As shown in FIGS. 1-4, a containment system 10, optionally called a rack storage system, for crabs 12 and other crustaceans has a frame 20 with a floor 24 and a series of upright posts 22 or upright exterior sidewalls extending from the floor 24. The floor 24 may be a series of stainless steel square tubes approximately 1 inch in height and 1 inch in width. A top side support bar 26 and a bottom side support bar 28 are provided between the upright exterior posts (or sidewalls). The frame 20 further has upright interior posts 30 or sidewalls that are spaced apart from one another and are disposed substantially parallel to the exterior posts 22 (or sidewalls). Shelf projections or tracks 32 extend inwardly from the interior sides of the support posts 22, 30 or sidewalls in a desired spacing arrangement. The posts 22, 30 and the tracks 32 are formed of corrosion resistant materials, such as stainless steel.

In the arrangement shown, the containment system 10 establishes twelve columns with tracks 32 in each column to support twelve tray compartments 40. Top front support 25 and top back support 27 stabilize connection of the outer corner posts 22.

The floor 24 of the frame 20 of the containment system 10 is provided with casters 36 or other wheels so that the position of the frame 20 may be moved within an aquaculture storage tank 80 of an aquaculture system (See FIG. 9), and so that the frame 20 may be rolled on support surfaces outside of the aquaculture storage tank 80 of the aquaculture system.

The aquaculture system may be either an open loop or a closed loop recirculating aquaculture system. In either type of aquaculture system multiple crabs may be housed and farmed in the aquaculture storage tank 80, with temperature-controlled water and nutrients supplied to the crabs, and waste filtered out of the tank water, in an automated manner. The aquaculture system may be adapted for hard shell and soft shell crabs, as well as other crustaceans. For crabs and crustaceans, the aquaculture storage tank 80 generally has an open top, is lighted, and the cross-flow water system is maintained at approximately 60° F.

Figure 3:
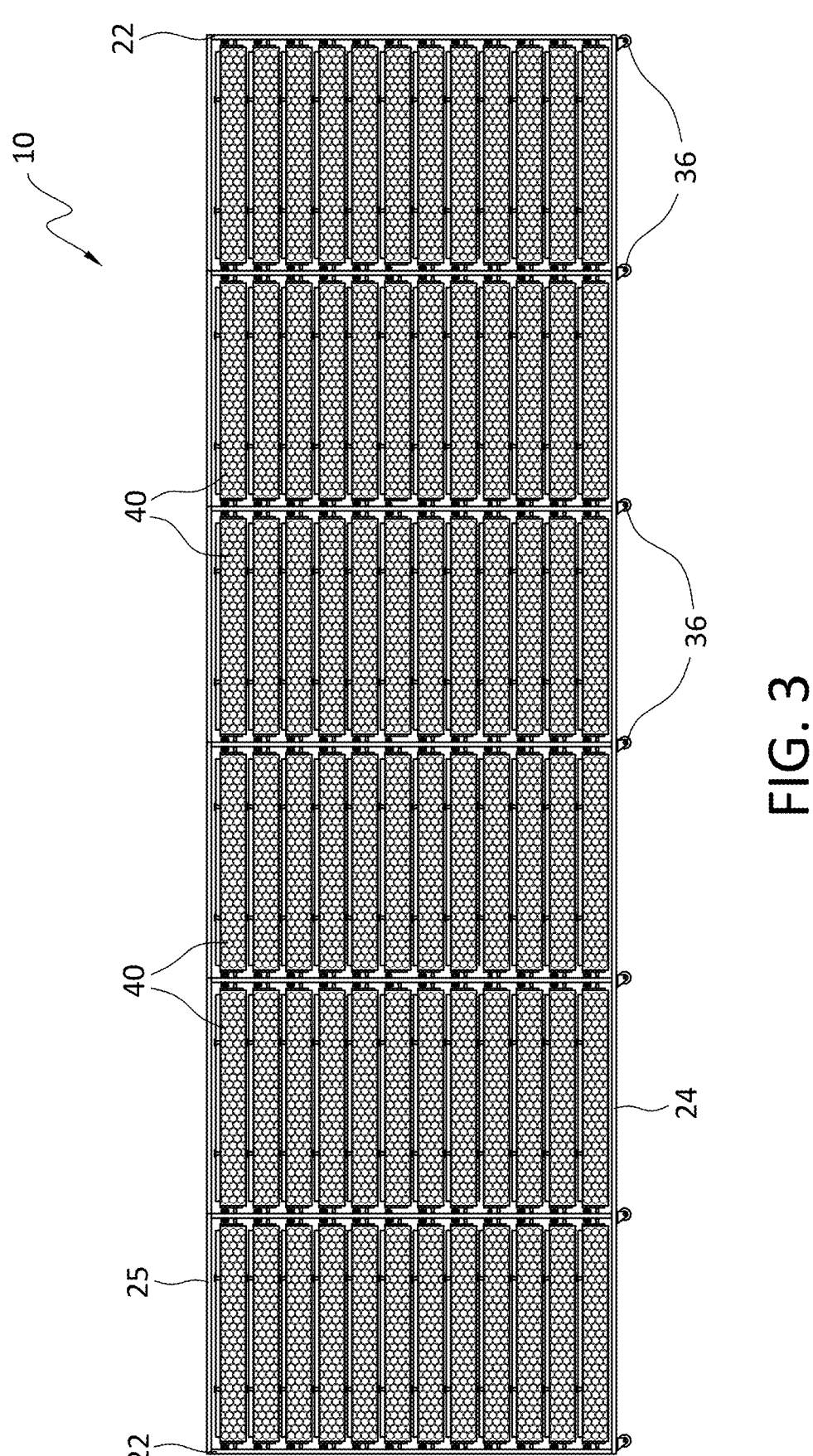
FIG. 3 is a front elevational view of the containment system of FIG. 1.
Figure 4:
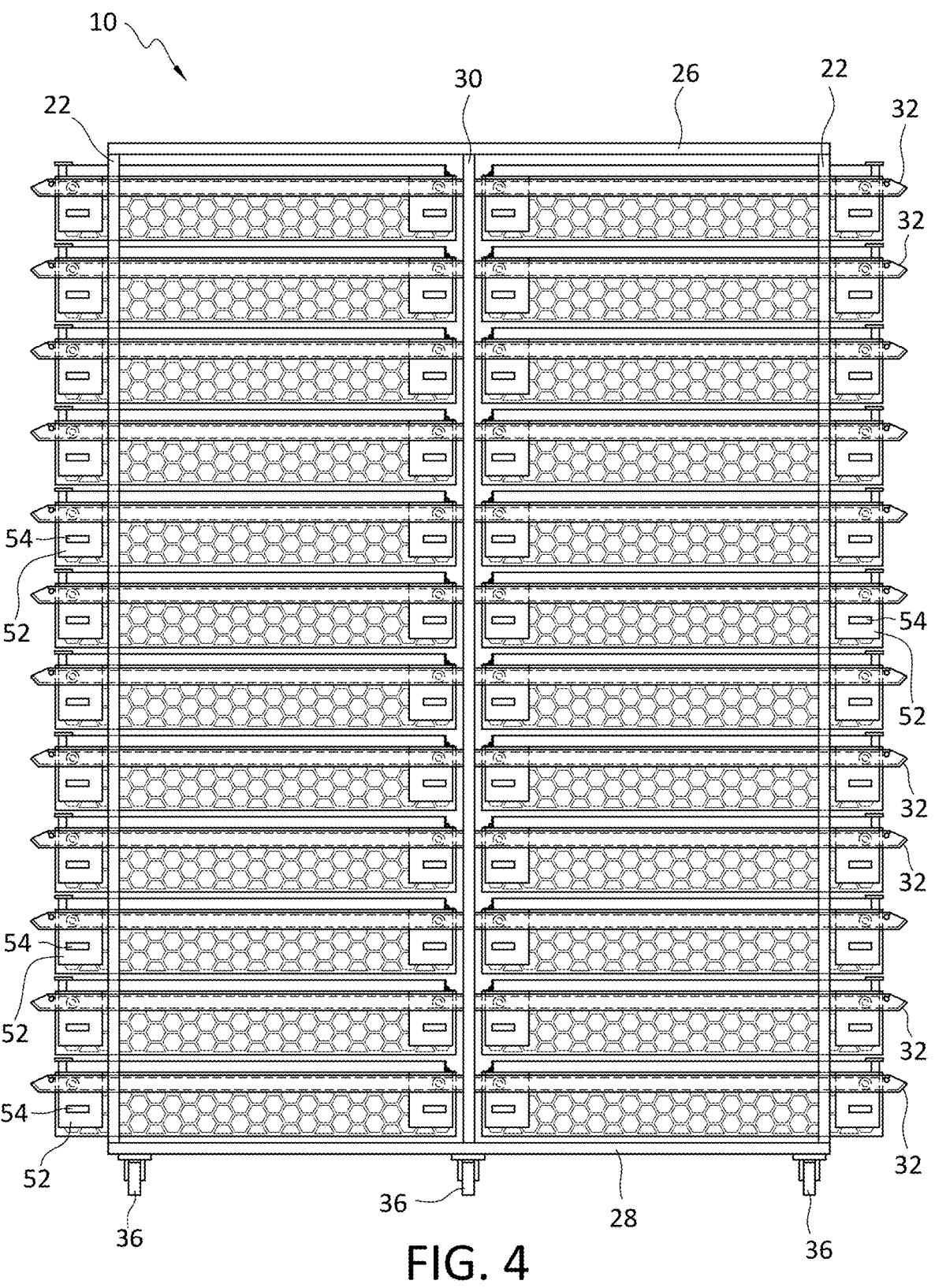
FIG. 4 is a side elevational view of the containment system of FIG. 1.
Figure 9:
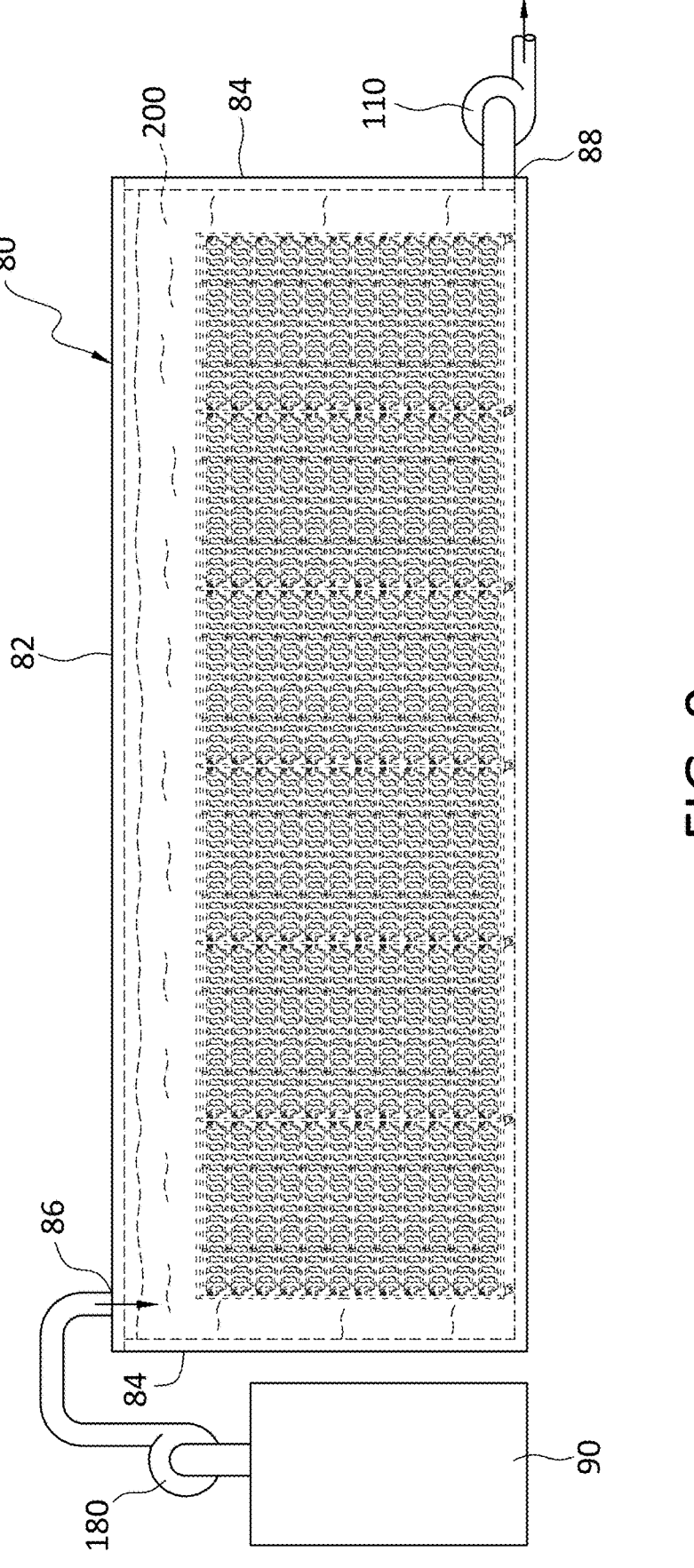
FIG. 9 is a front elevational view of an aquaculture system showing an aquaculture storage tank in which a containment system is submersed in liquid therein.

Referring to FIG. 9, the aquaculture storage tank 80 has an open top 82, a sidewall or sidewalls 84 and a bottom to create a tank volume space to receive the containment system(s) 10 submerged in liquid 200, which liquid 200 generally comprises water with nutrients for the crabs or other crustaceans. As one representative example, the containment systems 10 of FIG. 3 are shown immersed in the liquid 200 in the tank 80 in FIG. 9. The liquid 200 in this exemplary embodiment is temperature-controlled water from heater 90. The temperature-controlled water is pumped from the heater tank 90 into the storage tank 80 via pump 180. The aquaculture storage tank 80 may have a tank inlet 86 to receive the pumped water (or water with nutrients) and dispense such pumped water into the tank volume. A tank outlet 88 is provided through which liquid 200 entrained with waste from the crabs or other crustaceans is pumped out of the aquaculture storage tank 80 via pump 110 to convey the liquid 200 to anaerobic and aerobic tanks to manage water quality before recycling the water back to the aquaculture storage tank 80. The tank outlet 88 may include a sand filter and a bio filter remove solids and contaminants from the water cycled from the tank 80.

In the containment system 10 of FIGS. 1-4, tray compartments 40 each are sized to house a group of crabs 12 and are supported by the shelf projections or tracks 32. Each tray compartment 40 has a tray bottom 42, tray sides 44, a tray front wall 46, a tray back wall 47, and a tray top lid 48. The tray top lid 48 may be opened to permit access to the tray compartment interior. In the tray compartment 40 shown in FIGS. 5 and 6, the top lid 48 is hingedly connected by hinges 50 to the back wall 47. Two toggle latches 64 are provided to secure the tray top lid 48 in closed position. For example, the toggle latches 64 may be ½ inch wide and formed of vinyl. An additional pin log may be associated with the toggle latch 64 as a backup safety measure to ensure the toggle latch 64. The tray compartment 40 is supported in the containment system 10 by mount bearings 60 extending from the sidewalls 44 of the tray 40 that slide or roll on projecting shelf surfaces or tracks 32 extending from the sidewalls or upstanding posts 22, 30 of the containment system 10.

Figure 5:
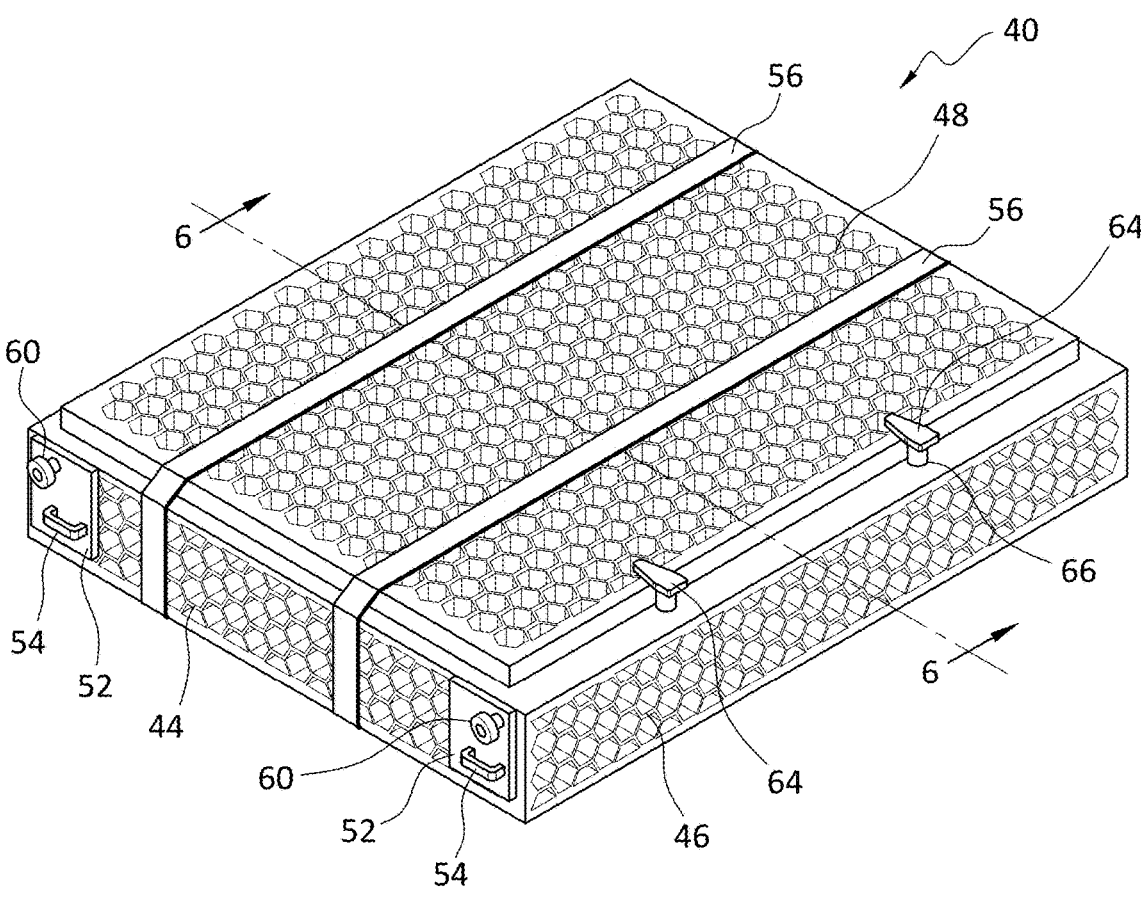
FIG. 5 is a left front perspective view of a tray compartment of the containment system of FIG. 1.
Figure 6:
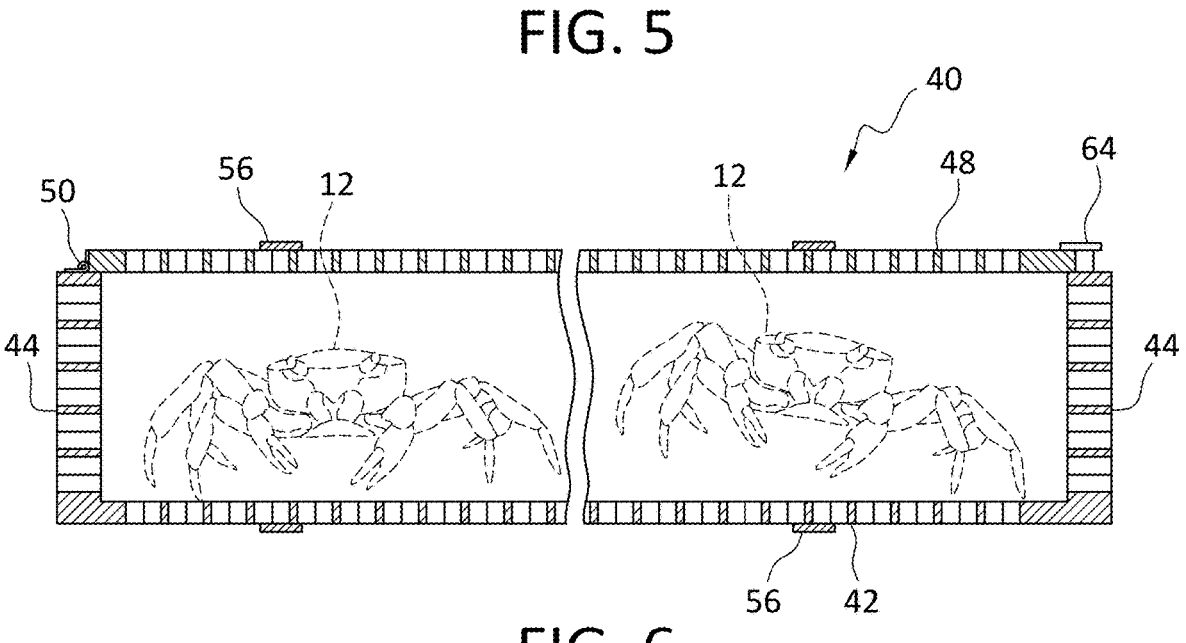
FIG. 6 is a cross-sectional view of the tray compartment of FIG. 5 taken along line 6-6 in FIG. 5.

In the embodiment shown in FIGS. 5 and 6, mount plates 52 are formed in or secured to the sidewalls 44. The mount bearings 60 project from the sidewalls 44. In addition, grip handles 54 extend from mount plates 52 on opposite sides of the tray compartment 40. Workers may grasp the grip handles 54 when moving the tray compartment 40 into or out of the frame 20. In some cases, automated equipment may attach to the grip handles 54 to maneuver the tray compartment 40.

A first crab or group of crabs 12 is held in a first tray compartment 40 within the containment system 10. See, e.g., FIGS. 5 and 6. It is envisioned that from one and up to 200 blue claw crabs may be housed in a tray compartment 40. A second group of crabs is held in a second tray compartment within the containment system. Each tray compartment 40 in the embodiment shown is formed of rigid vinyl mesh, with the mesh having relatively small (¼ inch to ⅜ inch) openings through which water and some nutrients may pass, but through which the individual crabs may not escape. The vinyl mesh may have a thickness of ¼ inch. For example, the tray compartments may be dimensioned: 5.75 inch by 48 inch by either 36 inch or 42 inch. The height of the tray compartments may be expanded via a removable sleeve 70 (see FIGS. 7 and 8) to reach approx. 10 inches or 11 inches with embedded latch 64 and handles 54 for ease of loading/extraction. Each case/tray compartment 40 is accessible via top-loading.

Reinforcement straps may be provided in association with the tray bottom 42 and the tray top lid 48. Reinforcement straps counter possible stretching of the mesh when the tray compartment holds the weight of multiple crabs or other crustaceans. If present, the reinforcement straps may be reinforced vinyl strapping or other tie down strapping that is suitable for use in marine environments. The straps may have a width of about 2 inches, and may be spaced in rows at approximately 12 inch intervals.

Figures 7, 8:
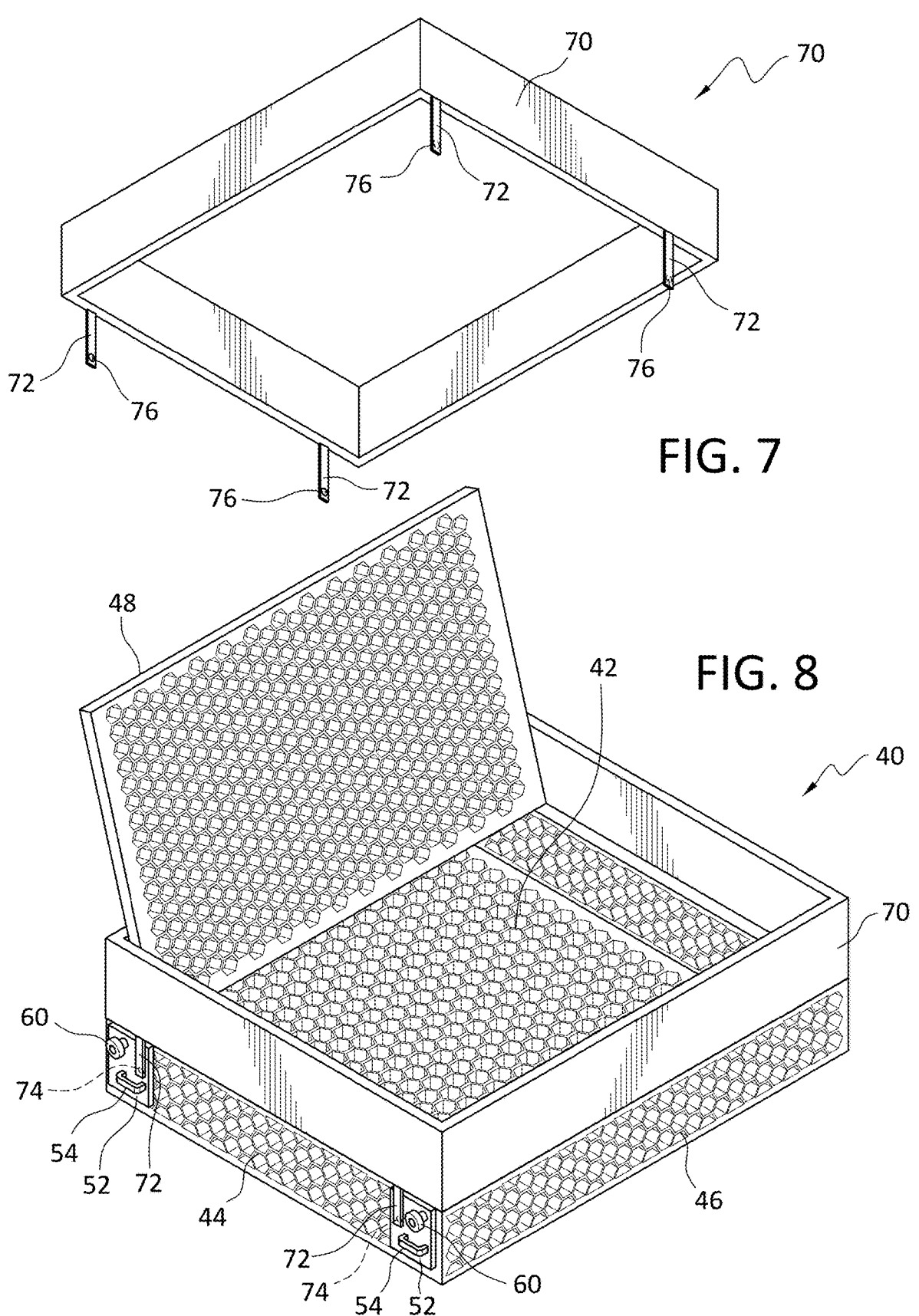
FIG. 7 is a left bottom perspective view of a removable sleeve that may be attached to a tray compartment of the containment system.
FIG. 8 is a left front perspective view of the tray compartment of the containment system with a removable sleeve attached thereto, showing the tray lid open for access to the tray compartment inner volume.

Referring next to FIGS. 7 and 8, a removable sleeve 70 may be appended to the top edges of the tray compartment 40. The removable sleeve 70 has an upstanding rectangular box shape sized to fit around the top edges of the tray compartment 40. Tie down straps 72 depend from the bottom edges of the removable sleeve 70. The tie down straps 72 each have snap projections 76 that mate with dimpled inserts 74 provided in the sidewalls 44 or in the mount plates 52 of the sidewalls 44 of the tray compartment 40. The removable sleeve 70 is formed either of rigid vinyl or other polymer, or of a suitable metal that is corrosion resistant or coated with a corrosion resistant coating. One example is rigid vinyl of about ¼ inch thickness and with a height of about 5 to about 6 inches. Once installed, the removable sleeve 70 extends the height of the tray compartment walls by another up to 6 inches and retards penetration or tearing by crab claws or other sharp edges. The removable sleeve 70 creates an additional volume space above the tray compartment 40 inner volume, which, when the tray lid 48 is opened, protects workers from aggressive behaviors of the crabs 12 contained in the tray compartment 40 and deters crabs or other crustaceans from evacuating the tray compartment 40.

An electric remote cable winch system may be leveraged for raising/lowering of the containment system assembly from the corners via cable to bottom steel beams. An electric remote cable winch system rated at 10 tons with 6 inch safety locks is one suitable option. The tray compartments are arranged in multiple rows and stacked to form columns. The containment system assembly is reinforced at its top and bottom and corners so that it may be raised up and removed from the aquaculture storage tank and/or lowered into the aquaculture storage tank with automated equipment. Alternatively, the containment assembly may be configured so that one column of stacked compartments may be raised from or lowered into the aquaculture storage tank.

Low temperature mitigates the risk of cannibalism of individual crabs as well as reducing their by-product production rates. Moreover, sufficient flow of nutrients to each crab housed in the containment assembly is maintained. And, the containment assembly is readily drained as it is raised out of the aquaculture storage tank.

It will be appreciated by those skilled in the art that changes could be made to the embodiments described above without departing from the broad inventive concept thereof. It is understood, therefore, that this disclosure is not limited to the particular embodiments disclosed, but it is intended to cover modifications within the spirit and scope of the present disclosure as defined by the appended claims.

REFERENCE NUMERALS 10 containment system for crabs or other crustaceans
12 crabs
20 frame
22 upright posts
24 floor of frame-bottom front support, bottom back support

25 top front support
26 top side support
27 top back support
28 bottom side support
30 upright posts
32 shelf projections or tracks
36 castors
40 tray compartment
42 tray bottom
44 tray sides
46 tray front wall
47 tray back wall
48 tray top lid
50 hinges
52 mount plate
54 grip handle
56 reinforcement strap
60 mount bearing/roller
64 toggle latch
66 pin lock
70 removable sleeve
72 tie down strap
74 dimpled insert to receive fastener
76 snap fastener/snap projection
80 aquaculture storage tank
82 top of storage tank
84 sidewall of storage tank
86 inlet to storage tank
88 outlet from storage tank
90 heater for tank liquid
110 pump
180 pump
200 liquid in tank (i.e., water with nutrients)

The invention claimed is:

1. A containment system for crabs or other crustaceans, comprising:

a frame supported for rolling movement within an aquaculture storage tank or on a support surface outside of the aquaculture storage tank, said frame having two or more upright walls or posts from which shelf projections or tracks extend;

at least one tray compartment, wherein the tray compartment has a top lid, a tray bottom, a front wall, a rear wall, and at least two sidewalls, and wherein the top lid, tray bottom, front wall, rear wall and sidewalls comprise a porous material through which a fluid may flow;

at least one pair of mount bearings associated with each tray compartment, with a first one of the mount bearings extending from the first sidewall and with a second one of the mount bearings extending from the second sidewall, said mount bearings configured to contact opposed shelf projections or tracks to support the tray compartment on or in said shelf projections or tracks;

at least one pair of handles associated with each tray compartment, with a first one of the handles extending from the first sidewall and with the second one of the handles extending from the second sidewall; and a removable sleeve detachably securable to surround at least upper portions of the front wall and sidewalls of the tray compartment so as to increase height of the front wall and sidewalls, wherein said sleeve is configured to be secured while the top lid is closed and remain secured while the top lid is opened;

wherein each tray compartment is adapted to hold multiple crabs or crustaceans therein; and wherein each tray compartment is dimensioned to be slidingly or rollingly received between two of the upright walls or posts and supported by the mount bearings on opposed shelf projections or tracks extending from respective two upright walls or posts.

2. The containment system of claim 1, wherein the tray compartment sidewalls have a height of not more than 7 inches.

3. The containment system of claim 1, wherein the porous material comprises a mesh, a rigid vinyl mesh or a metal mesh.

4. The containment system of claim 1, wherein the porous material comprises a mesh with honeycomb-shaped mesh openings.

5. The containment system of claim 1, wherein the top lid is hingedly connected to the rear wall of the tray compartment.

6. The containment system of claim 5, further comprising at least one toggle latch to secure the lid in closed position.

7. The containment system of claim 1, wherein the removable sleeve surrounds at least upper portions of the front wall, rear wall and sidewalls of the tray compartment.

8. The containment system of claim 1, further comprising securement straps to join the removable sleeve to the tray compartment.

9. The containment system of claim 8, further comprising at least one dimple sleeve insert formed in at least one of the front wall or sidewalls of the tray compartment or in at least one mount plate formed in or secured to a sidewall that is configured to receive a mating snap projection of one of the securement straps.

10. The containment system of claim 1, further comprising reinforcement straps in contact with the tray bottom.

11. The containment system of claim 1, further comprising reinforcement straps in contact with the tray lid.

12. The containment system of claim 1, further comprising mount plates secured to the sidewalls of the tray compartments.

13. The containment system of claim 12, wherein the handles are joined to the mount plates.

14. The containment system of claim 12, wherein the mount bearings project from the mount plates.

15. An aquaculture system for crustaceans, comprising:

an aquaculture storage tank; and a containment system disposed inside the aquaculture storage tank, said containment system comprising:

a frame supported for rolling movement within the aquaculture storage tank or on a support surface outside of the aquaculture storage tank, said frame having two or more upright walls or posts from which shelf projections or tracks extend;

at least one tray compartment, wherein the tray compartment comprises a porous material through which a fluid may flow, and wherein the tray has a top lid, a tray bottom, a front wall, a rear wall, and at least two sidewalls;

at least one pair of mount bearings associated with each tray compartment, with a first one of the mount bearings extending from the first sidewall and with a second one of the mount bearings extending from the second sidewall, said mount bearings configured to contact opposed shelf projections or tracks to support the tray compartment on or in said shelf projections or tracks; and at least one pair of handles associated with each tray compartment, with a first one of the handles extending from the first sidewall and with the second one of the handles extending from the second sidewall;

and a removable sleeve detachably securable to surround at least upper portions of the front wall and sidewalls of the tray compartment so as to increase height of the front wall and sidewalls, wherein said sleeve is configured to be secured while the top lid is closed and remain secured while the top lid is opened wherein each tray compartment is adapted to hold multiple crabs or crustaceans therein;

wherein each tray compartment is dimensioned to be slidingly or rollingly received between two of the upright walls or posts and supported by the mount bearings on opposed shelf projections or tracks extending from respective two upright walls or posts; and wherein the aquaculture storage tank is filled with water in a volume that is sufficient to fully submerge each tray compartment in the containment system disposed inside the aquaculture storage tank.

16. The aquaculture system of claim 15, further comprising:

one or more pumps for pumping water into the aquaculture storage tank;

wherein water is pumped in a volume that is sufficient to flow into and retain each tray compartment in the containment system submerged in water while disposed inside the aquaculture storage tank.

17. The aquaculture system of claim 16, further comprising a heater to control temperature of the water that is pumped into the aquaculture storage tank, wherein the water comprises temperature controlled recirculated water.

18. The aquaculture system of claim 15, wherein the containment system comprises a first plurality of tray compartments arranged in a first column, and further comprises a second plurality of tray compartments arranged in a second column, with both columns of tray compartments disposed in the aquaculture storage tank and fully submerged by water in the aquaculture storage tank.

19. The aquaculture system of claim 18, wherein the second column of tray compartments is stacked onto the first column of tray compartments of the containment system.

20. The aquaculture system of claim 18, wherein the second column of tray compartments is adjacent to the first column of tray compartments of the containment system.

* * * * *